(12) United States Patent
Shi et al.

(10) Patent No.: US 10,189,502 B2
(45) Date of Patent: Jan. 29, 2019

(54) WHEEL BEAM TYPE AXLELESS VEHICLE FRAME

(71) Applicant: SHANGHAI LUNLIANG MECHANICAL AND ELECTRICAL SCIENCE-TECHNOLOGY CO., LTD, Shanghai (CN)

(72) Inventors: Yu Shi, Beijing (CN); Yanqi Xing, Changchun (CN); Jiatao Tian, Siping (CN); Hui Liu, Siping (CN); Taifeng Liu, Siping (CN); Bingwen Yan, Siping (CN); Tongchao Han, Jilin (CN); Guoxiang Shi, Changchun (CN)

(73) Assignee: SHANGHAI LUNLIANG MECHANICAL AND ELECTRICAL SCIENCE-TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/535,962

(22) PCT Filed: Oct. 28, 2015

(86) PCT No.: PCT/CN2015/093058
§ 371 (c)(1),
(2) Date: Jun. 14, 2017

(87) PCT Pub. No.: WO2016/101700
PCT Pub. Date: Jun. 30, 2016

(65) Prior Publication Data
US 2017/0349214 A1    Dec. 7, 2017

(30) Foreign Application Priority Data

Dec. 22, 2014 (CN) .......................... 2014 1 0805476

(51) Int. Cl.
*B62D 63/02* (2006.01)
*B62D 21/08* (2006.01)
(Continued)

(52) U.S. Cl.
CPC ............. *B62D 21/08* (2013.01); *B62D 21/02* (2013.01); *B62D 21/03* (2013.01); *B62D 21/12* (2013.01);
(Continued)

(58) Field of Classification Search
CPC ....... B62D 21/02; B62D 21/08; B62D 21/183
(Continued)

(56) References Cited

U.S. PATENT DOCUMENTS 4,217,970 A * 8/1980 Chika ................. B60G 21/055
                                                180/298
5,833,269 A * 11/1998 Gastesi ................. B62D 21/04
                                                280/785

(Continued)

FOREIGN PATENT DOCUMENTS

CN          1188056 A       7/1998
CN        201405932 Y       2/2010
(Continued)

OTHER PUBLICATIONS

International Search Report and Written Opinion dated Jan. 22, 2016 for PCT Application PCT/CN2015/093058 filed Oct. 28, 2015.
EP Search for EP15871773.6, dated Jul. 17, 2018, 13 pages.

*Primary Examiner* — D Glenn Dayoan
*Assistant Examiner* — Sunsurraye Westbrook

(57) ABSTRACT

The present application discloses a wheel beam type axleless vehicle frame that comprises five sections in sequence from front to back, including a front hanging rack, a front wheel carrier, an intermediate coupling rack, a rear wheel carrier, and a rear hanging rack. Every two adjacent sections (Continued)

amongst the five sections are manufactured and connected in a unified and standardized integrated mode; a modular combination structure is used; and the five sections, which are independent respectively, may be assembled and adjusted according to requirements, and have sufficient strength and stiffness as well as completely independent interchangeability. The vehicle frame has the advantages that match with the needs of an electric vehicle, and thus may be used as the optimum configuration frame for the electric vehicle; and the vehicle frame may be improved according to requirements to be applicable to various fuel and hybrid electric passenger vehicles and commercial vehicles.

9 Claims, 8 Drawing Sheets

(51) Int. Cl.
*B62D 21/02* (2006.01)
*B62D 21/03* (2006.01)
*B62D 21/12* (2006.01)
*B62D 21/14* (2006.01)
*B62D 21/18* (2006.01)
*B62D 21/20* (2006.01)

(52) U.S. Cl.
CPC ............. *B62D 21/14* (2013.01); *B62D 21/18* (2013.01); *B62D 21/20* (2013.01); *B62D 63/025* (2013.01)

(58) Field of Classification Search
USPC .......... 280/787, 28.5, 79.11, 806, 68.5, 830; 296/204; 414/492, 528; 180/312, 65.21, 180/65.51, 68.5, 9.42; 29/897.2, 428, 469
See application file for complete search history.

(56) References Cited

U.S. PATENT DOCUMENTS

| | | | |
|---|---|---|---|
| 8,955,632 B2* | 2/2015 | Schurna | ............... B62D 23/005 180/210 |
| 2002/0149235 A1* | 10/2002 | Alderson | ................. B60G 3/20 296/205 |
| 2009/0014993 A1 | 1/2009 | Tope | |

FOREIGN PATENT DOCUMENTS

| | | |
|---|---|---|
| CN | 201405934 Y | 2/2010 |
| CN | 201446977 U | 5/2010 |
| CN | 202080335 U | 12/2011 |
| CN | 202358193 U | 8/2012 |
| CN | 103359171 A | 10/2013 |
| CN | 103754265 A | 4/2014 |
| CN | 104494700 A | 4/2015 |
| CN | 204341194 U | 5/2015 |

\* cited by examiner

WHEEL BEAM TYPE AXLELESS VEHICLE FRAME

FIELD OF THE INVENTION

The present invention relates to a key supporting assembly of a motor vehicle, relates to the technical fields of passenger vehicles and commercial vehicles, and in particular relates to a universal axleless vehicle frame for realizing lightweight, electrification, intelligentization and modularization of a motor vehicle.

BACKGROUND OF THE INVENTION

A running system of a motor vehicle comprises a vehicle frame, axles, suspensions, and wheels, wherein the vehicle frame is an important part of basic members and the running system of the motor vehicle; a power assembly of the motor vehicle and various assemblies of a chassis thereof are all installed onto the vehicle frame; also, the vehicle frame is a base for supporting carriage, and is required to have enough stiffness and appropriate flexibility which may have a key influence on the performance of the whole vehicle. An existing frame structure of a motor vehicle still follows principle of the model T (ladder frame), where front and rear axles (a bridge rack, a portal axle, and the like) serving as cross sections and vehicle beams serving as longitudinal sections are hinged by using leaf springs to form a vehicle frame that supports and receives the loads of an chassis and the whole vehicle, and the supporting, transmission and location functions of the axles are still not changed. Such a structure is simple, and good in manufacturability, but has the disadvantages of high weight, high vehicular center of gravity, occupancy of much central position, and the like. Although the frames of a monocoque bus and a platform frame car in modern times have no such disadvantages, the arrangement of assemblies is still limited. With the development of electrification, intelligentization and lightweight, it also calls for the emergence of new vehicle frames meeting the requirements.

The existing vehicle frames are mainly divided into the following several types according to different structures: first, a crossbeam type structure, including a backbone type, a side beam type, and a comprehensive type, and mainly applied to buses and trucks; second, a platform frame that is shaped once and suitable for integrated mass production of cars; and third, a space type (steel tube type) monocoque structure that is mainly applicable to large buses, less in such forms as an IRS type and a semi-frame type.

However, the three ways all have the following major disadvantages: for the crossbeam type structure, front and rear axles serve as the cross sections and longitudinal beams are spanned over the axles, resulting in occupancy of most middle space of the vehicle body and difficulty lowering of the height of the center of gravity with the width of the vehicle frame being restricted by numerous factors. For the platform vehicle frame, bridge racks are set up as supports; high technical requirements are made on longitudinal framework connections and lateral integrated shaping connections; one vehicle model requires one mold, and the production process is complicated with high remodeling costs. For the space type monocoque vehicle frame, a crossbeam is decomposed into a plurality of trusses, resulting in occupancy of the overall space and increase of the vehicle body height. Such a vehicle frame also has the disadvantages of complicated design, numerous parts, strict requirements on the technical process, high production costs, numerous weld joints, and reduction of the allowable stress.

In patent applications including publication No. CN103381851A, published on Nov. 6, 2013 and entitled "ELECTRIC VEHICLE CHASSIS", and publication No. CN1631690A, published on Jun. 29, 2005 and entitled "ELECTRIC VEHICLE CHASSIS WITH INDEPENDENTLY-SUSPENDED AND INDEPENDENTLY-DRIVEN REAR WHEELS", the integrated vehicle frames presented therein both follow principle of ladder frame with partial improvements, but no new axleless structure is achieved in any one of them; in addition, the requirements on the electric, lightweight and intelligent functions are also not well met.

SUMMARY OF THE INVENTION

An objective of the present application is to provide a wheel beam type axleless vehicle frame.

According to the present application, the locating and bearing functions of an axle are needless for intelligent output of a power shaft of a motor for an electric vehicle, and therefore, an axleless vehicle frame may be more reasonable. The axleless vehicle frame is optimally designed in accordance with a mechanical structure principle with emphasis on reasonable placement of forces and moments by overcoming the above disadvantages of the existing chassis frames and absorbing the respective advantages thereof. The functions of the axles are resolved to supporting and bearing by a floor and sides; a space is reserved for the transmission shaft; the vehicle frame is directly hinged with and bears suspensions that are directly connected with the wheels; the action of forces is transferred according to a motion trajectory; the objectives of reducing the height of a motor vehicle chassis, expanding the using space between two wheels and increasing the axle distance are achieved; and the entire vehicle with all driven wheels and total independent suspensions allowing complete output of the power shaft are formed.

According to the present application, the structure functions and effects of integrated axles, live axles and corresponding bridges are completely cancelled. The vehicle frame is integrated; one end of a suspension system is directly installed on the vehicle frame to bear the weight of a vehicle body, while the other end thereof is connected to wheels, with a simplified power output shaft. The vehicle frame directly positions the wheels by means of suspensions.

According to the present application, by fully considering the general arrangement, structural mechanics features, manufacturing process, lightweight, intelligentization and electrification of a motor vehicle, the arrangement of suspension, steering systems and a power system for the motor vehicle are adjusted, such that the effect of improving a plurality of properties is achieved.

The wheel beam type axleless vehicle frame comprises five sections in sequence from front to back, including a front hanging rack, a front wheel carrier, an intermediate coupling rack, a rear wheel carrier, and a rear hanging rack. Every two adjacent sections amongst the front hanging rack, the front wheel carrier, the intermediate coupling rack, the rear wheel carrier and the rear hanging rack are connected in a unified standardized connection mode; the vehicle frame is configured to be a modular combination structure and the front hanging rack, the front wheel carrier, the intermediate coupling rack, the rear wheel carrier and the rear hanging rack are independent respectively and are configured to be assembled and adjusted according to requirements, and have sufficient strength and stiffness as well as completely independent interchangeability.

The front hanging rack is located at the front end and comprises two first longitudinal main beams, two first auxiliary beams and a plurality of first cross arms as well as accessories. The first longitudinal main beams and the first auxiliary beams are configured to be adjusted up and down and shifted from side to side according to the requirements of different vehicle models and then hinged together, and the front hanging rack is configured into a holder type, a passage type or a seat type in combination with different accessories, with a length adjustable according to requirements. The holder type is used for installation of power members such as an engine and a transmission. The passage type is used for setting up a passage. The seat type is used for setting up seats.

The front wheel carrier and the rear wheel carrier are the same in structure, each of which comprises two bridges, two bridge auxiliary racks, two H-shaped wheel beams, two H-shaped wheel beam bases, two H-shaped wheel beam auxiliary racks, two M-shaped wheel beams and four M-shaped wheel beam auxiliary racks as well as some accessories. Parts for each of the front wheel carrier and the rear wheel carrier are connected integrally. A distance between bottom ends of the two bridges is greater than a distance between bottom ends of the two bridges, and the two bridges are shaped into a trapezoidal structure; and the two bridges are connected with the H-shaped wheel beams into a grid-shaped structure, thereby forming a stable integrated wheel carrier used for installation of a wheel assembly and for supporting a vehicle body. Each side structure of the grid-shaped structure is combined with an upper portion of M-shaped wheel beams to form a multi-point space connection that provides higher applicability and better stability and is applicable to various suspensions and adaptive to multiple wheel combination types and multiple vehicle models.

The bridges, each of which is a U-shaped integral member, are disposed in middle positions of the front wheel carrier and the rear wheel carrier. Two bridges are combined into a trapezoidal structure being wide in bottom and narrow in top for supporting and stabilizing and expanding a wheel tread space. Two bridge auxiliary racks are located at both sides of the bridges of each of the front wheel carrier and the rear wheel carrier for lateral supporting and longitudinal connecting. Two H-shaped wheel beams are located at left and right sides of a bottom surface of each of the front wheel carrier and the rear wheel carrier, and perpendicularly intersect with the bridge auxiliary racks for stable connecting the whole wheel carriers.

The H-shaped wheel beam bases are disposed below the H-shaped wheel beams; the H-shaped wheel beam auxiliary racks are disposed above the H-shaped wheel beams, and integrally combined with the H-shaped wheel beams to form an integrated framework. The H-shaped wheel beam auxiliary racks are perpendicularly connected with the bridges and the bridge auxiliary racks, and intersect with the M-shaped wheel beams by means of the M-shaped wheel beam auxiliary racks.

The M-shaped wheel beams, each of which is an arched beam, are perpendicularly mounted on the bridge auxiliary racks. The top surfaces of the M-shaped wheel beams are connected with the bridges. The M-shaped wheel beams are mounted on the left and right sides, one on each side, to form two arched spaces on the left and right sides for installation of wheel suspension assemblies for bearing load, stabilizing upstand, and adjusting height. The M-shaped wheel beam auxiliary racks are located between the M-shaped wheel beams and the bridges to laterally support the M-shaped wheel beams.

The intermediate coupling rack is arranged between the front wheel carrier and the rear wheel carrier, and comprises two second longitudinal main beams, two second auxiliary beams, and a plurality of cross arms as well as accessories. A section of the intermediate coupling rack is of a trapezoidal structure. The second longitudinal main beams and the second auxiliary beams are configured to be adjusted up and down and shifted from side to side according to the requirements of different vehicle models and then hinged together, and can also be designed into a straight bottom type, an interlayer type, an outwardly flanged type or an inwardly converged type in combination with different accessories. The intermediate coupling rack is able to be adjusted to any length according to requirements so as to meet the requirements of different axle distances.

The rear hanging rack is located at the rear end and comprises two third longitudinal main beams, two third auxiliary beams and a plurality of third cross arms as well as accessories. The third longitudinal main beams and the third auxiliary beams are configured to be adjusted up and down and shifted from side to side according to the requirements of different vehicle models and then hinged together, and are configured into a holder type, a warehouse type, a passage type or a seat type in combination with different accessories. The length of the rear hanging rack is able to be adjusted according to requirements. The holder type is used for installation of power members such as an engine and a transmission. The warehouse type is used for storing goods. The passage type is used for setting up a passage. The seat type is used for setting up seats.

In addition, according to the present application, width spaces for setting up tires are reserved only at the positions of the front wheel carrier and the rear wheel carrier, and other positions, including the intermediate coupling rack, the front hanging rack, the rear hanging rack, and the passage portions of the front wheel carrier and rear wheel carrier, all can be designed with a low floor, such that the floor height of the motor vehicle is reduced significantly and the space is utilized reasonably. In order to achieve local strengthening for different vehicle models, more than twenty types of various accessories in corresponding connection thereto are established.

Either driving wheels or driven wheels, and either steering wheels or non-steering wheels can be installed on the front wheel carrier and the rear wheel carrier, and four-wheel steering and multi-wheel driving can be achieved. The space of the two wheel carriers may fully guarantee the spatial arrangement of a power shaft, a steering ball head, a steering lever, an elastic element, a damper, a balancing lever and the like.

The grid-shaped internal and external members composed of the H-shaped wheel beams and dual bridges may achieve an existing car independent suspension mode by means of the M-shaped beams and surrounding space. By using a plurality of elastic elements for bearing, adjusting a suspension guide structure and adding a conduction device, a new suspension system is realized. It is suitable for various independent suspensions. Wheels are directly coupled with the vehicle frame by means of the suspension system, and wheel alignment is directly achieved with the vehicle frame as reference; thus, the axleless vehicle frame is realized.

Beneficial Effects of the Present Application:

1. Using a modular combination mode, mass production is facilitated and standardized assembly is achieved at low costs. The vehicle frame may be integrally designed and assembled, and may also be sectionally assembled. Accessories are simple in structure and controllable in changeability. Reasonable arrangement of various assemblies and parts is facilitated. The five sections are connected in a standardized and unified connection mode, and may also be disassembled, integrated and transformed into a plurality of vehicle models.

2. The axleless (bridgeless) hinged vehicle frame achieves laterally-loaded connection of the vehicle frame, wheel alignment (camber and toe-in of front wheels, caster and inclination of master pins, and the like), and integration of suspensions and elastic elements as well as resistance points on the vehicle frame. The removal of the axles is advantageous for improvement of weight reduction, and the vehicle frame has the advantages of lightweight, high strength, high stiffness, and changing of torsion and bending in a controllable range, and can reasonably bear all the loads. It can be matched with elastic elements other than leaf springs in various independent suspensions, with reasonable mechanics distribution, lowered center of gravity, various decreased horizontal and vertical moments, and reduced energy consumption. With a plurality of stereo trapezoidal structures, lateral forces, longitudinal forces, and torsion can be decomposed.

3. The floor height of the motor vehicle can be reduced significantly, such that the utilization of the vehicle interior space is improved effectively and comfort is enhanced.

4. The vehicle frame has the advantages that match the needs of an electric vehicle, and thus may be used as the optimum configuration frame for the electric vehicle. It is widely applicable with a practical value for various carrier vehicles, passenger vehicles, and commercial vehicles. It is applicable to electric vehicles, and also applicable to hybrid electric and fuel vehicles.

5. The performance of a motor vehicle can be improved through moderate adjustment. The vehicle frame is suitable for four-wheel and multi-wheel driving, for both of which independent suspensions are used. Car adjustable accessories are adaptive to various suspensions, such as a double wishbone type, a McPhaeson type, a sliding pillar type, a multi-connecting rod type, and the like, thus enhancing comfort in running. It is convenient for development and utilization of overall performance of a motor vehicle, and can allow adjusting variations in vehicle body, trafficability, axle distance and turning radius, and improvements in comfort and stability of the entire vehicle. In short, it is a platform mode for setup of design and manufacture of a novel motor vehicle.

DETAILED DESCRIPTION OF THE EMBODIMENTS

Figure 1:
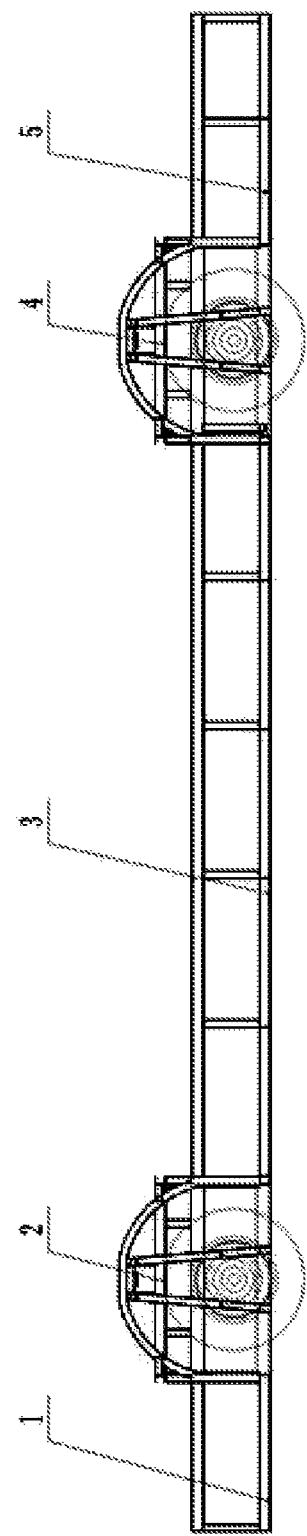
FIG. 1 is a side view of an exemplary embodiment of the present disclosure.
Figure 2:
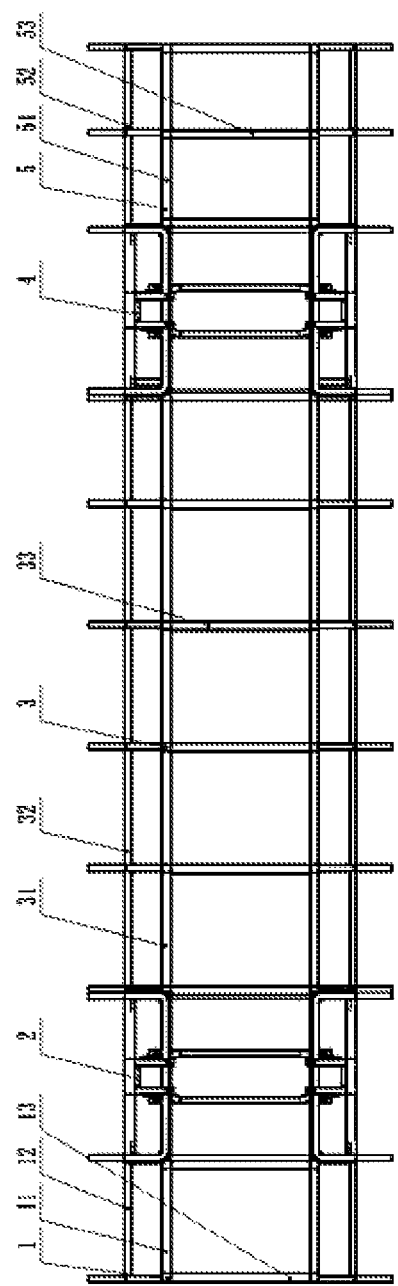
FIG. 2 is a top view of the embodiment of FIG. 1.
Figure 3:
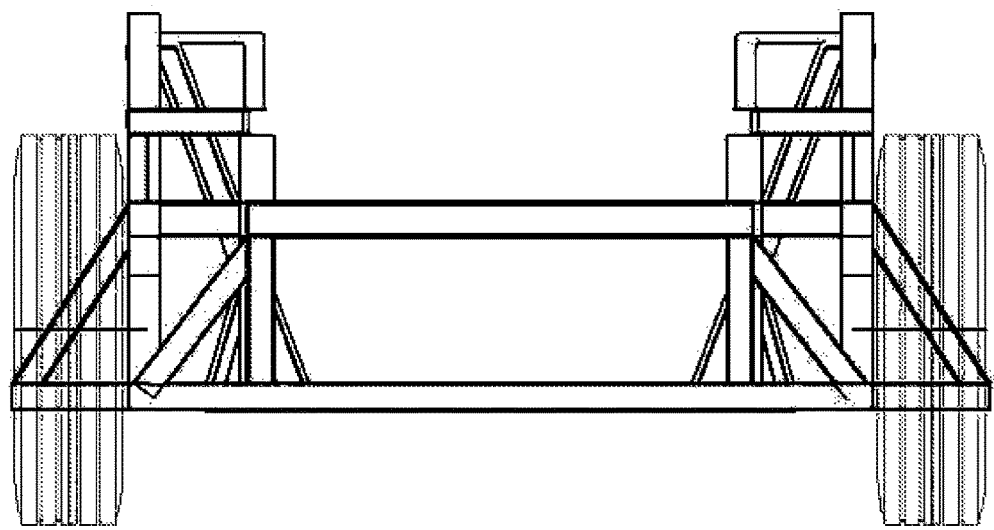
FIG. 3 is an end view of the embodiment of FIG. 1.
Figure 4:
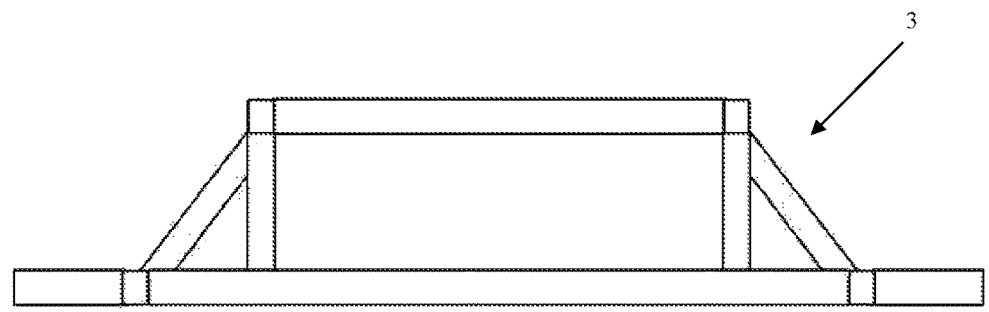
FIG. 4 is a sectional view of an intermediate coupling rack of the embodiment of FIG. 1.
Figure 5:
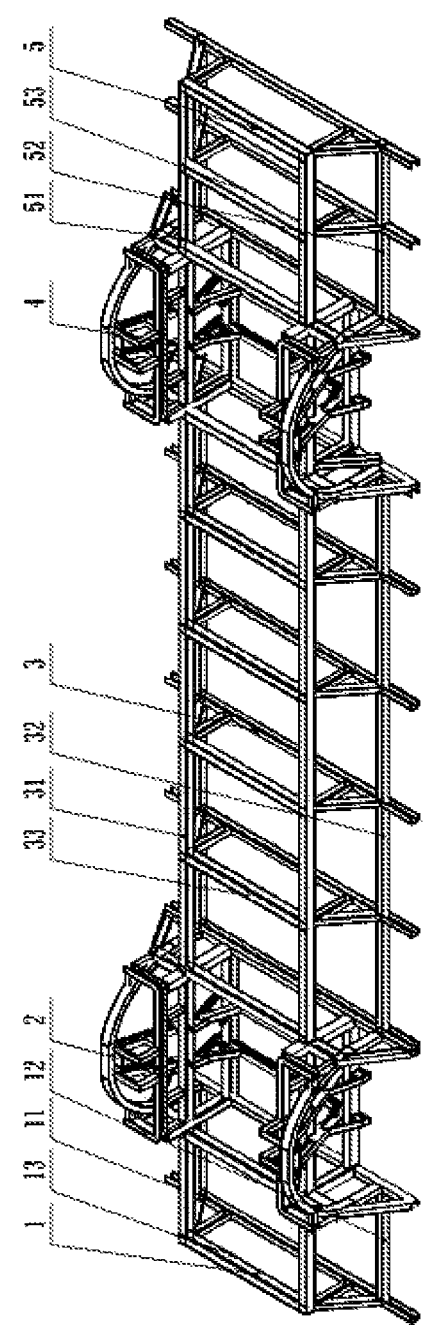
FIG. 5 is an isometric view of the embodiment of FIG. 1.
Figure 6:
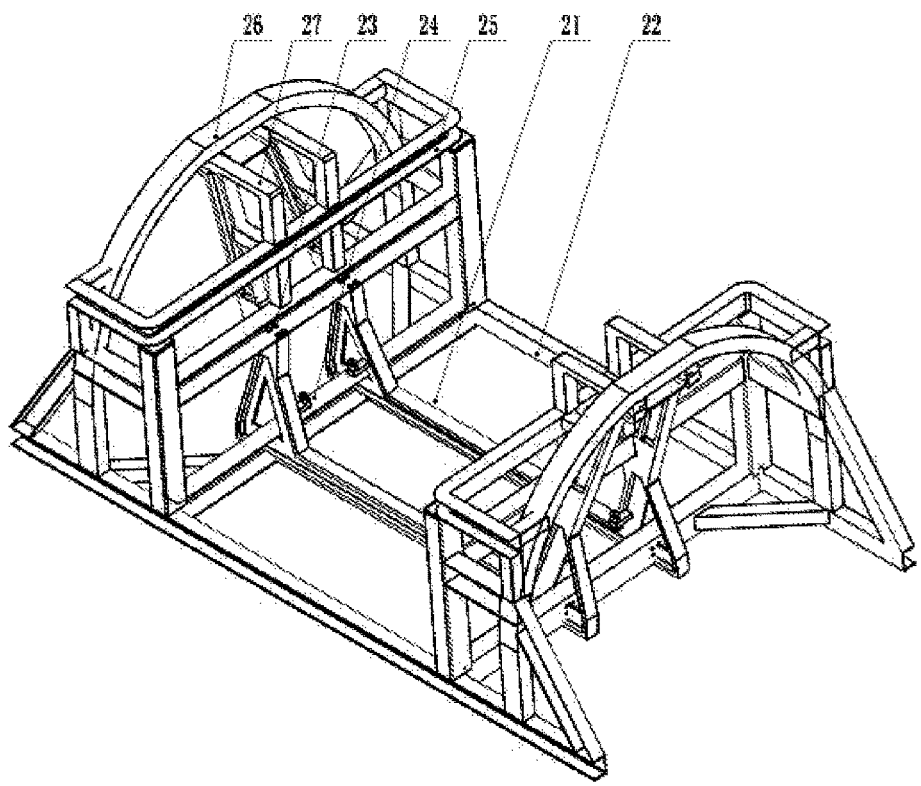
FIG. 6 is an isometric view of a wheel carrier section of the embodiment of FIG. 1.
Figure 7:
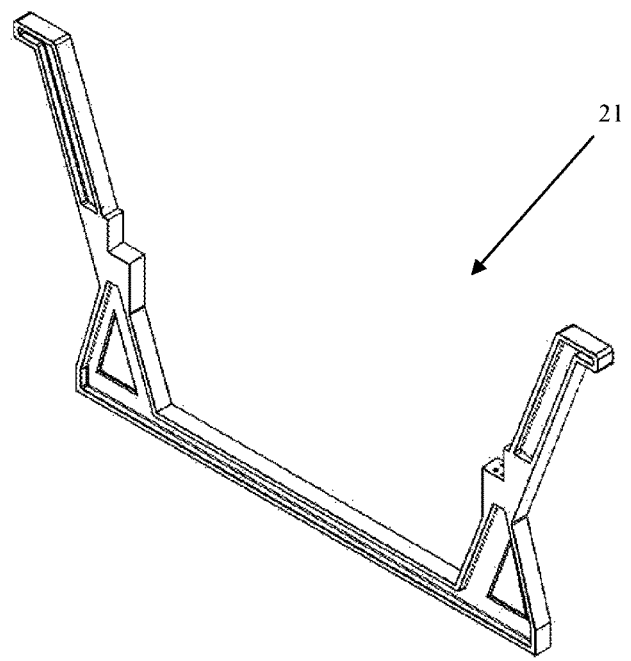
FIG. 7 is an isometric view of a bridge member of the wheel carrier section of the embodiment of FIG. 1.
Figure 8:
FIG. 8 is an isometric view of a bridge auxiliary rack of the wheel carrier section of the embodiment of FIG. 1.
Figure 9:
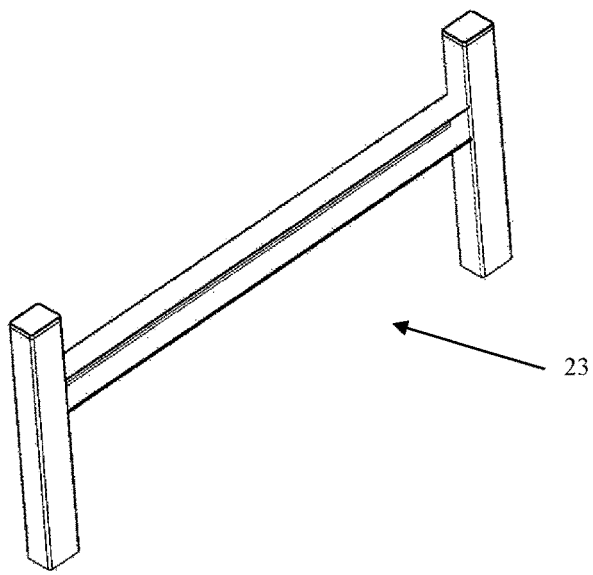
FIG. 9 is an isometric view of an H-shaped wheel beam member of the wheel carrier section of FIG. 6.
Figure 10:
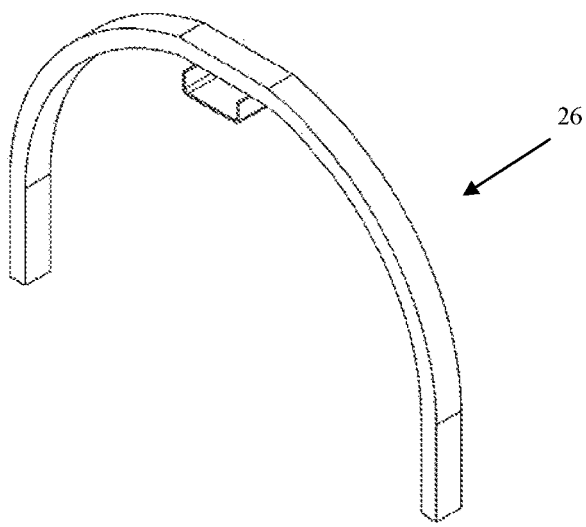
FIG. 10 is an isometric view of an M-shaped wheel beam member of the wheel carrier section of FIG. 6.

With reference to FIG. 1 to FIG. 10, the wheel beam type axleless vehicle frame comprises five sections in sequence from front to back, including a front hanging rack 1, a front wheel carrier 2, an intermediate coupling rack 3, a rear wheel carrier 4, and a rear hanging rack 5. Every two adjacent sections amongst the front hanging rack 1, the front wheel carrier 2, the intermediate coupling rack 3, the rear wheel carrier 4 and the rear hanging rack 5 are connected in a unified and standardized connection mode. A modular combination structure is used. The front hanging rack 1, the front wheel carrier 2, the intermediate coupling rack 3, the rear wheel carrier 4 and the rear hanging rack 5, which are independent respectively, can be assembled and adjusted according to requirements, and have sufficient strength and stiffness as well as completely independent interchangeability.

The front hanging rack 1 is located at the front end and comprises two first longitudinal main beams 11, two first auxiliary beams 12 and a plurality of first cross arms 13 as well as accessories. The first longitudinal main beams 11 and the first auxiliary beams 12 can be adjusted up and down and shifted from side to side according to the requirements of different vehicle models and then hinged together, and can also be designed into a holder type, a passage type or a seat type in combination with different accessories, with a length adjustable according to requirements. The holder type is used for the installation of power members such as an engine and a transmission. The passage type is used for setting up a passage. The seat type is used for setting up seats.

The front wheel carrier 2 and the rear wheel carrier 4 are the same in structure, each of which comprises two bridges 21, two bridge auxiliary racks 22, two H-shaped wheel beams 23, two H-shaped wheel beam bases 24, two H-shaped wheel beam auxiliary racks 25, two M-shaped wheel beams 26 and four M-shaped wheel beam auxiliary racks 27 as well as some accessories. Parts for each of the front wheel carrier 2 and the rear wheel carrier 4 are connected integrally. A distance between bottom ends of the two bridges 21 is greater than a distance between top ends of the two bridges 21, and the two bridges 21 are formed into a trapezoidal structure; the two bridges 21 are connected as a whole with the H-shaped wheel beams into a grid-shaped structure, thereby forming a stable integrated wheel carrier used for the installation of a wheel assembly and for supporting a vehicle body. Each side structure of the grid-shaped structure is combined with an upper portion of each M-shaped wheel beams 26 to form a multi-point space connection that provides higher applicability and better stability, is applicable to various suspensions with adaptability to multiple wheel combination types and multiple vehicle models.

The bridges 21, each of which is a U-shaped integral member, are disposed in middle positions of the front wheel carrier 2 and the rear wheel carrier 4. Two bridges 21 are combined into a trapezoidal structure wide in bottom and narrow in top, which plays a leading role in supporting and stabilization and can achieve an effect of expanding a tread space. Two bridge auxiliary racks 22 are located at both sides of the bridges 21 of each of the front wheel carrier 2 and the rear wheel carrier 4, playing a role in lateral support and longitudinal connection. Two H-shaped wheel beams 23 are located at left and right sides of a bottom surface of each of the front wheel carrier 2 and the rear wheel carrier 4, and perpendicularly intersect with the bridge auxiliary racks 22, playing a role in stable connection for the whole wheel carriers.

The H-shaped wheel beam bases 24 are disposed below the H-shaped wheel beams 23, while the H-shaped wheel beam auxiliary racks 25 are disposed above the H-shaped wheel beams 23, and are integrally combined with the H-shaped wheel beams 23 to form an integrated framework. The H-shaped wheel beam auxiliary racks 25 are perpendicularly connected with the bridges 21 and the bridge auxiliary racks 22, and intersect with the M-shaped wheel beams 26 by means of the M-shaped wheel beam auxiliary racks 27.

The M-shaped wheel beams 26, each of which is an arched beam, are perpendicularly mounted on the bridge auxiliary racks 22. The top surfaces of the M-shaped wheel beams 26 are connected with the bridges 21. The M-shaped wheel beams 26 are mounted on the left and right sides, one on each side, to form two arched spaces on the left and right sides for the installation of wheel suspension assemblies, and play a role in load bearing, upstand stabilization, and height adjustment. The M-shaped wheel beam auxiliary racks 27 are located between the M-shaped wheel beams 26 and the bridges 21 to laterally support the M-shaped wheel beams 26.

The intermediate coupling rack 3 is located between the front wheel carrier 2 and the rear wheel carrier 4 and comprises two second longitudinal main beam 31, two second auxiliary beams 32, and a plurality of second cross arms as well as accessories. A section of the intermediate coupling rack 3 is of a trapezoidal structure. The second longitudinal main beams 31 and the second auxiliary beams 32 can be adjusted up and down and shifted from side to side according to the requirements of different vehicle models and then hinged together, and can also be designed into a straight bottom type, an interlayer type, an outwardly flanged type or an inwardly converged type in combination with different accessories. The intermediate coupling rack 3 can be adjusted to any length so as to meet the requirements of different axle distances.

The rear hanging rack 5 is located at the rear end and comprises two third longitudinal main beams 51, two third auxiliary beams 52 and a plurality of third cross arms 53 as well as accessories. The third longitudinal main beams 51 and the third auxiliary beams 52 can be adjusted up and down and shifted from side to side according to the requirements of different vehicle models and then hinged together, and can also be designed into a holder type, a warehouse type, a passage type or a seat type in combination with different accessories, with a length adjustable according to requirements. The holder type is used for the installation of power members such as an engine and a transmission. The warehouse type is used for storing goods. The passage type is used for setting up a passage. The seat type is used for setting up seats. In addition, according to the present application, width spaces for setting up tires are reserved only at the positions of the front wheel carrier 2 and the rear wheel carrier 4, and other positions, including the intermediate coupling rack 3, the front hanging rack 1, the rear hanging rack 5, and the passage portion of the front wheel carrier 2 and rear wheel carrier 4, all can be designed with a low floor, such that the floor height of the motor vehicle is reduced significantly and the space is utilized reasonably. In order to achieve local strengthening for different vehicle models, more than twenty types of various accessories in corresponding connection thereto are established.

Either driving wheels or driven wheels, and either steering wheels or non-steering wheels can be installed on the front wheel carrier 2 and the rear wheel carrier 4, and four-wheel steering and multi-wheel driving can be achieved. The space of the two wheel carriers may fully accommodate the spatial arrangement of a power shaft, a steering ball head, a steering lever, an elastic element, a damper, a balancing lever and the like.

The grid-shaped internal and external members composed of the H-shaped wheel beams 23 and dual bridges 21 may achieve an existing car independent suspension mode by means of the M-shaped beams 26 and surrounding space. By using a plurality of elastic elements for bearing, adjusting a suspension guide structure and adding a conduction device, a new suspension system is realized. It is suitable for various independent suspensions. Wheels are directly coupled with the vehicle frame by means of the suspension system, and wheel alignment is directly achieved with the vehicle frame as reference; thus, the axleless vehicle frame is realized.

Figure 11:
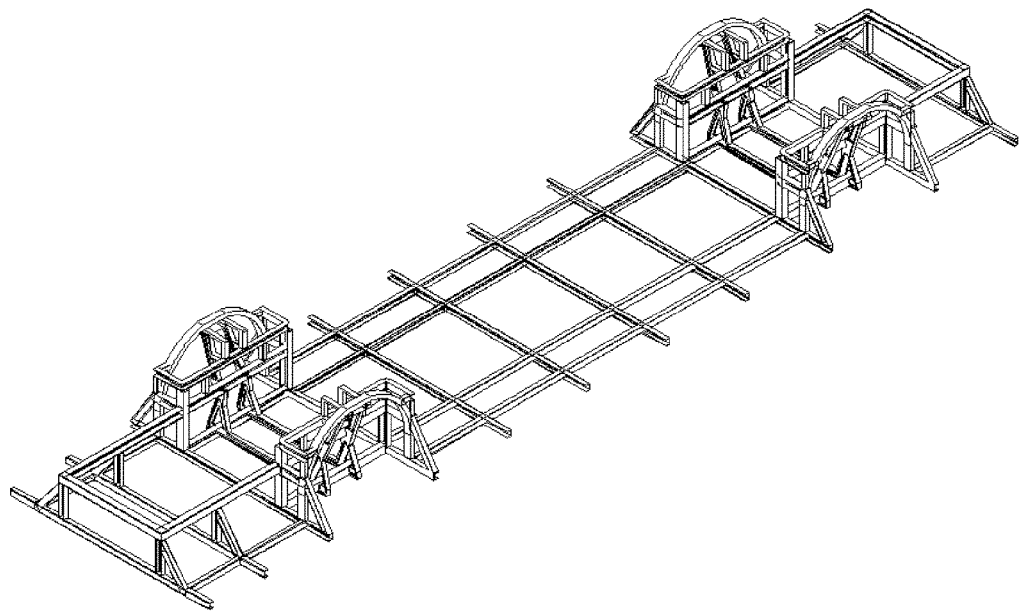
FIG. 11 and FIG. 12 are isometric and side structural schematic diagrams, respectively, of the wheel beam type axleless vehicle frame of an embodiment of the present disclosure for use on a low floor of a bus at different angles of view.
Figure 12:
Figure 13:
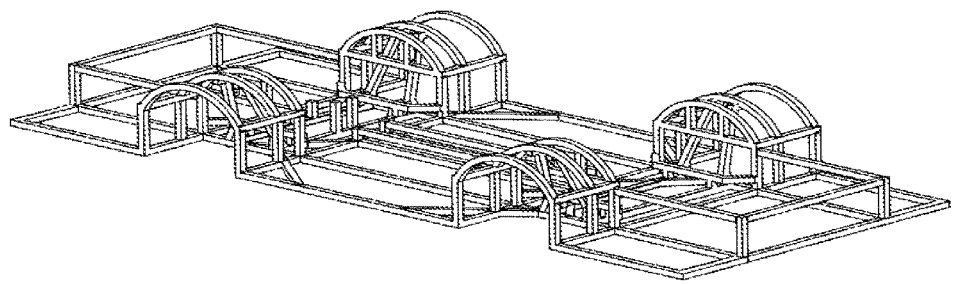
FIG. 13 and FIG. 14 are isometric and side structural schematic diagrams, respectively, of the wheel beam type axleless vehicle frame of an embodiment of the present disclosure for use on a car at different angles of view.
Figure 14:
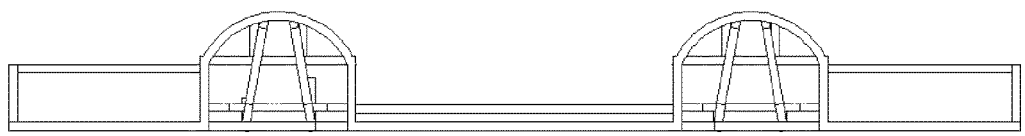
Figure 15:
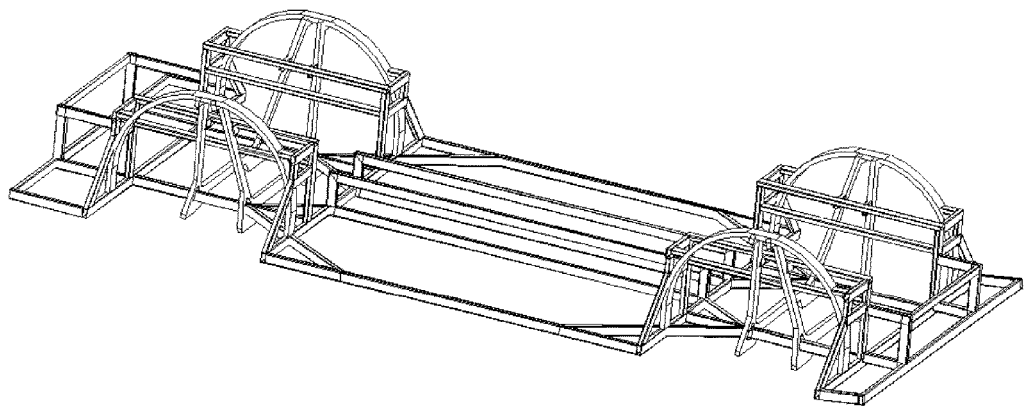
FIG. 15 and FIG. 16 are isometric and side structural schematic diagrams, respectively, of the wheel beam type axleless vehicle frame of an embodiment of the present disclosure for use on an off-road vehicle at different angles of view.
Figure 16:
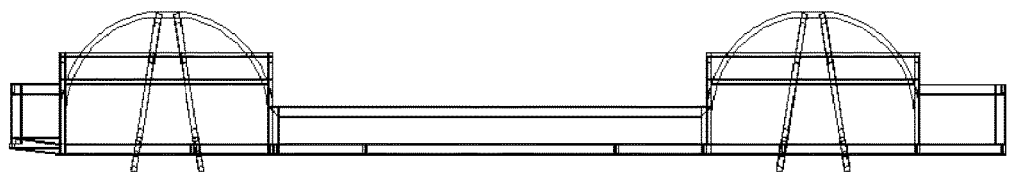

The wheel beam type axleless vehicle frame provide by the present application is applicable to various types of vehicles, for example, buses, cars, off-road vehicles, and the like. FIG. 11 to FIG. 16 illustrate structures of the wheel beam type axleless vehicle frame of the present application used on a low floor of a bus, a car and an off-road vehicle at different angles of view, respectively.

The invention claimed is:

1. A wheel beam type axleless vehicle frame, comprising:
    five sections in sequence from front to back, including a front hanging rack, a front wheel carrier, an intermediate coupling rack, a rear wheel carrier, and a rear hanging rack,
    wherein every two adjacent sections amongst the front hanging rack, the front wheel carrier, the intermediate coupling rack, the rear wheel carrier and the rear hanging rack are connected in a unified and standardized connection mode;
    wherein the vehicle frame is configured to be a modular combination structure;
    wherein the front hanging rack, the front wheel carrier, the intermediate coupling rack, the rear wheel carrier and the rear hanging rack are independent, respectively, and are configured to be assembleable, adjustable, and interchangeable;
    wherein the front wheel carrier and the rear wheel carrier are the same structure, each of which comprises two bridges, two bridge auxiliary racks, two H-shaped wheel beams, two H-shaped wheel beam bases, two H-shaped wheel beam auxiliary racks, two M-shaped wheel beams, and four M-shaped wheel beam auxiliary racks;

wherein parts for each of the front wheel carrier and the rear wheel carrier are connected integrally;

wherein a distance between bottom ends of the two bridges is greater than a distance between top ends of the two bridges, and the two bridges are formed into a trapezoidal shape;

wherein the two bridges are connected with the H-shaped wheel beams into a grid-shaped structure, thereby forming a stable integrated wheel carrier used for the installation of a wheel assembly and for supporting a vehicle body; and wherein each side structure of the grid-shaped structure is combined with an upper portion of the M-shaped wheel beams to form a multi-point space connection that is adaptable to multiple wheel combination types and multiple vehicle models.

2. The wheel beam type axleless vehicle frame according to claim 1, wherein the intermediate coupling rack comprises two second longitudinal main beams, two second auxiliary beams, and a plurality of second cross arms and accessories;

wherein a section of the intermediate coupling rack has a trapezoidal shape;

wherein the second longitudinal main beams and the second auxiliary beams are configured to be adjusted up and down and shifted from side to side, and hinged together.

3. The wheel beam axleless vehicle frame according to claim 1, wherein the second longitudinal main beams and the second auxiliary beams are configured into one of a straight bottom type, an interlayer type, an outwardly flanged type or an inwardly converged type; and wherein the intermediate coupling rack (3) is able to be adjusted to a variety of lengths.

4. The wheel beam type axleless vehicle frame according to claim 1, wherein the front hanging rack is located at the front end and comprises two first longitudinal main beams, two first auxiliary beams and a plurality of first cross arms;

wherein the first longitudinal main beams and the first auxiliary beams are configured to be adjusted up and down and shifted from side to side, and hinged together; and wherein the length of the front hanging rack is adjustable.

5. The wheel beam type axleless vehicle frame according to claim 1, wherein the rear hanging rack comprises two third longitudinal main beams, two third auxiliary beams and a plurality of third cross arms; and wherein the third longitudinal main beams and the third auxiliary beams are configured to be adjusted up and down and shifted from side to side, and then hinged together.

6. The wheel beam type axleless vehicle frame according to claim 1, wherein the front hanging rack is configured into a holder type, a passage type or a seat type; and wherein the rear hanging rack is configured into a holder type, a warehouse type, a passage type or a seat type.

7. The wheel beam type axleless vehicle frame according to claim 1, wherein the bridges, each of which is a U-shaped integral member, are disposed in middle positions of the front wheel carrier and the rear wheel carrier;

wherein two bridges are combined into a trapezoidal structure being wide in bottom and narrow in top for supporting and stabilizing and expanding a wheel tread space;

wherein two bridge auxiliary racks are located at both sides of the bridges of each of the front wheel carrier and the rear wheel carrier for lateral supporting and longitudinal connecting;

wherein two H-shaped wheel beams are located at left and right sides of a bottom surface of each of the front wheel carrier and the rear wheel carrier, and perpendicularly intersect with the bridge auxiliary racks for stable connecting the whole wheel carriers;

wherein the H-shaped wheel beam bases are disposed below the H-shaped wheel beams;

wherein the H-shaped wheel beam auxiliary racks are disposed above the H-shaped wheel beams, and integrally combined with the H-shaped wheel beams to form an integrated framework;

wherein the H-shaped wheel beam auxiliary racks are perpendicularly connected with the bridges and the bridge auxiliary racks, and intersect with the M-shaped wheel beams by means of the M-shaped wheel beam auxiliary racks;

wherein the M-shaped wheel beams, each of which is an arched beam, are perpendicularly mounted on the bridge auxiliary racks;

wherein top surfaces of the M-shaped wheel beams are connected with the bridges;

wherein the M-shaped wheel beams are mounted on the left and right sides, one on each side, to form two arched spaces on the left and right sides for the installation of wheel suspension assemblies, for bearing load, stabilizing upstand, and adjusting height; and wherein the M-shaped wheel beam auxiliary racks are located between the M-shaped wheel beams and the bridges to laterally support the M-shaped wheel beams.

8. The wheel beam type axleless vehicle frame according to claim 1, wherein the vehicle frame is adjustable to adapt to various electric vehicle running systems including hybrid electric and fuel vehicles, and is also adaptable to various vehicle models, including one or more of a bus, a middle bus, an articulated vehicle, a van-type truck, an off-road vehicle, a commercial vehicle, a car, and a sports car, by adding accessories, and by adjusting structural sizes of individual elements of the frame.

9. The wheel beam type axleless vehicle frame according to claim 1, wherein functional changes to the vehicle frame are implementable through structural changes including adjustment of an arrangements of wheels, suspensions, and a steering system, and by adjustment of the configuration of a transmission system.

* * * * *